US006896477B1

(12) United States Patent
Kertész

(10) Patent No.: US 6,896,477 B1
(45) Date of Patent: May 24, 2005

(54) CROSS-FLOW FAN WITH A CLOSED SUCTION ELEMENT, AND SMOOTH FLOWING SUCTION SEPARATION DEVICE

(76) Inventor: András Kertész, Nyiregyháza-Sóstófürdô, Állomás u. 34, H-4431 (HU)

( * ) Notice: Subject to any disclaimer, the term of this patent is extended or adjusted under 35 U.S.C. 154(b) by 105 days.

(21) Appl. No.: 10/110,479

(22) PCT Filed: Oct. 11, 2000

(86) PCT No.: PCT/HU00/00104

§ 371 (c)(1),
(2), (4) Date: Aug. 29, 2002

(87) PCT Pub. No.: WO01/26445

PCT Pub. Date: Apr. 19, 2001

(30) Foreign Application Priority Data

Oct. 12, 1999 (HU) .................................... 9903510

(51) Int. Cl.[7] .............................................. A01F 12/44
(52) U.S. Cl. ..................... 415/53.1; 415/203; 415/206; 460/99
(58) Field of Search ............................... 415/53.1, 203, 415/206; 460/99

(56) References Cited

U.S. PATENT DOCUMENTS 1,920,952 A * 8/1933 Anderson .................. 415/53.1
3,664,349 A 5/1972 Quick ......................... 130/27
3,807,495 A * 4/1974 Skarecky ................... 415/53.1
3,828,531 A * 8/1974 Quick ....................... 415/53.1
3,833,006 A 9/1974 Temple ........................ 130/27
4,705,453 A * 11/1987 Hopfensperger ........... 415/53.1
4,906,219 A * 3/1990 Matousek et al. .......... 415/203
4,913,679 A * 4/1990 Bender ........................ 460/99

FOREIGN PATENT DOCUMENTS

EP 0 683 970 A 11/1995
RU 2 133 149 A 7/1999

* cited by examiner

*Primary Examiner*—F. Daniel Lopez
*Assistant Examiner*—Igor Kershteyn
(74) *Attorney, Agent, or Firm*—Joseph G. Seeber

(57) ABSTRACT

A cross-flow fan is operated in a suction mode, mainly in air-ducts with a large width, to provide a smooth flow of regulatable air. In accordance with the invention, a smooth flow suction separation device is suitable for the regulated suction to a large width of an amount of air containing a solid fraction, and is also suitable for the separation of the solid fraction on the inlet side. In certain forms of its construction, the flow of air is made to circulate. The smooth flowing suction separation device is equipped with a curved centrifugal separation device and a fraction outlet. A characteristic feature of the invention is that it has a cross-flow rotor, a housing constructed as a pneumatic duct, and a closed suction element attached to the internal edge of a centrifugal separation device.

21 Claims, 2 Drawing Sheets

Fig. 3

Figure 2:
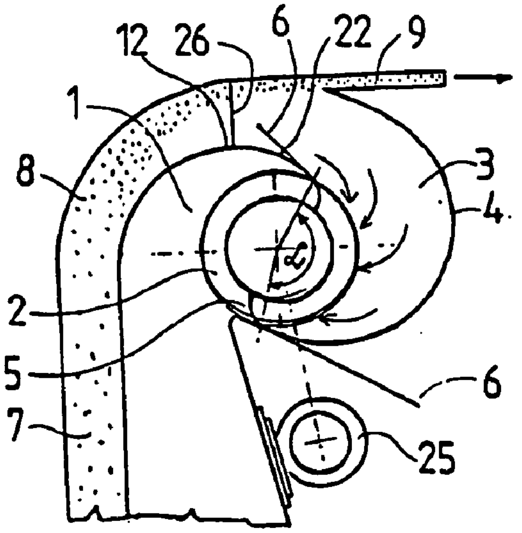

CROSS-FLOW FAN WITH A CLOSED SUCTION ELEMENT, AND SMOOTH FLOWING SUCTION SEPARATION DEVICE

The invention relates to a cross-flow fan that may also be operated in suction mode, mainly in air-ducts with a large width, to provide a smooth flow of regulatable air, and relates to a smooth flow suction separation device that is suitable for the regulated suction to a large width of an air amount containing a solid fraction, and for the separation of the solid fraction on the inlet side, and in certain forms of its construction with the flow of air being made to circulate.

The solutions according to the invention may be favourably applied in agriculture, for example, in crop dryers, in grain cleaning machines, in cereals and mill industry processes, in bulk material transportation, but it can also be used in the suction of places that are dangerous to the environment and health, also separating the sucked out fraction.

In air engineering practice a frequent problem is the movement of air from large spaces to the intake opening of a relatively small-sized fan. This task is solved with large pipe structure, which is costly and takes up a large amount of space. Such an example of this can be seen on FIG. 235 in the Process machines and equipment volume of the Hungarian Cereals Industry Handbook, in a grain-drying machine. In other fields, for example, for establishing an air-curtain at a door, a compressed air operating, large width cross-flow fan taking air from outdoors is used favourably. Although cross-flow fans can be favourable constructed with a wide diameter, they are not used in suction operation mode, basically because of their suction operation from the open air.

In agriculture and the cereals industry air-extraction separation equipment is used as supplementary equipment to flat screen seed cleaners or on its own, to which, in general, a centrifugal fan is attached from the outside, a separation cyclone and these are connected to each other with a pipe structure. This practise takes up a lot of space and is costly.

Mainly in the cereals industry circulation air boxes are also used, as is illustrated on pages 61 and pages between 81–84. On FIG. 31 it can be seen that a large number of components need to be connected to an external centrifugal fan for a smooth flow to be created in the wide, pneumatic duct and in the deposit chamber. The flow pattern is complex.

The purpose of the invention is to create a large width, smooth flow fan that may also be used in suction mode, and with which the amount of air can be easily regulated, or the creation of a smooth flow suction, separation device that is suitable even at large widths for the suction of a regulated amount of air containing a solid fraction and for the separation of the solid fraction on the suction side, while at the same time retaining economic dimensions.

The invention is based on the recognition that a cross-flow fan may also be operated in suction mode, if a closed suction element is used that is constructed in harmony with the flow path of the sucked in air and the curve of the mantle of which at the place where it joins the housing is formed at the continuation of the rotor blade, and also on the recognition that in order to separate the solid fraction from the flowing medium it is enough to create a centrifuge effect in a short, curved pipe section, so it is practical to branch off the separated fraction near to the initial separation place.

The set aim can be reached, if a rotor with a closed suction element is placed in the house of the cross-flow fan constructed as a pneumatic duct, or if the smooth flowing suction separation device according to the invention is equipped with a curved centrifugal separator, fraction outlet, which has a cross-flow rotor, a house constructed as a pneumatic duct and a closed suction element attached to the internal edge of the centrifugal separator.

In certain constructions of the possible cross-flow fan and smooth flowing suction separation device according to the invention the suction element external mantle joining the two terminal points of the arc angle of the air entering the rotor and the suction element internal mantle have a common tangent line with the rotor blade at the joining point.

In the case of certain suction separation devices according to the invention, in order to create a fraction outlet a dense-current fraction outlet joins the centrifugal separator tangentially, while in the case of other constructions for the suction of the solid fraction a cellular or screw-system fraction suction device is connected to the part of the closed suction element extended with a deposit chamber.

In the case of any construction of the suction separation device according to the invention the suction and pressure ducts are arranged beside each other, and they may also have a common dividing wall.

Favourably, the intake opening and outlet opening of any of the suction separation devices can also be connected to a circulation element.

In the case of any suction separation device the suction duct has a bulk material feeder to perform, for example, air-flow delivery tasks, or a bulk material feeder and a bulk material outlet, for example, to clean cereals.

In the case of a possible construction of the suction separation device, between the bulk material feeder and the bulk material outlet, in the side of the intake duct there are shutter elements one after the other, and the horizontally included angle of the shutter elements is bigger than the natural slope angle of the bulk material, and the angle determined by the line of shutter elements is bigger than the angle of the shutter elements to the horizontal level, but a maximum of 90°, the angle of the straight line connecting the lower and upper edges of the successive shutter elements to the horizontal level is smaller than the natural slope angle of the bulk material.

In the interest of controlling the amount and the speed of air, all fans and suction separation devices according to the invention have a drive mechanism that rotates the rotor with a regulatable number of revolutions per minute.

Figure 3:
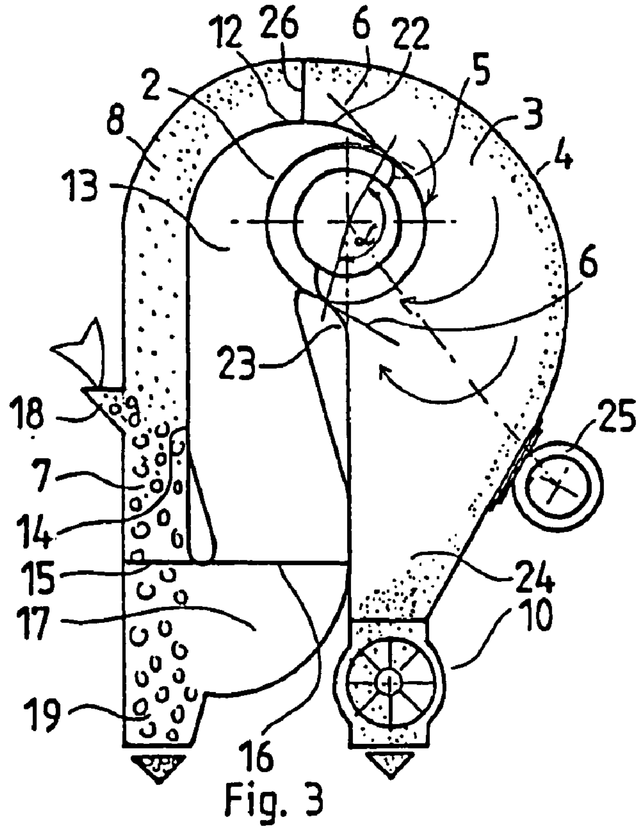
Figure 4:
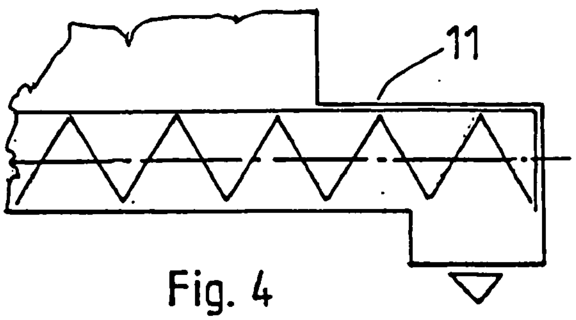
Figure 5:
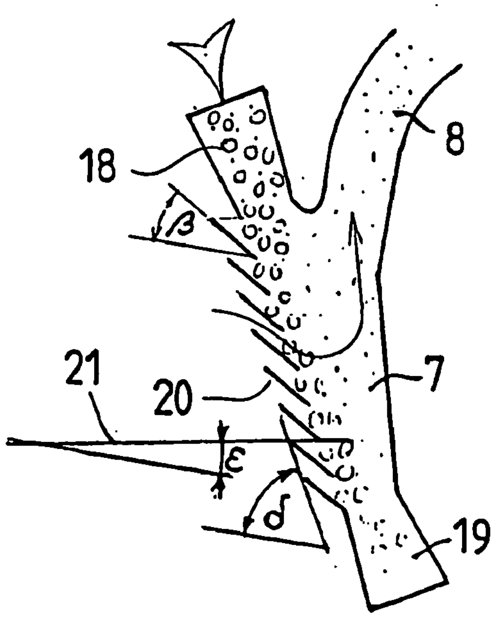
Figure 6:
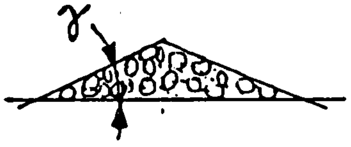

Below the invention is described in more detail with construction examples and drawings. In the attached drawing FIG. 1 is the plan of the centrifugal separation device according to the basic idea of the invention, in cross-section, FIG. 2 is the suction separation device according to the invention, with dense-current fraction outlet, in diagrammatic cross-section, FIG. 3 is the cross-section drawing of a suction separation device with a cellular fraction outlet, perpendicular to the axis, FIG. 4 is the cross-section drawing of the axial section of a screw-system fraction outlet, FIG. 5 is the cross-section drawing of the fragmentary section of a cross-flow shutter-type air-blast system, FIG. 6 shows a heap of bulk material to demonstrate the natural slop-angle.

Figure 1:
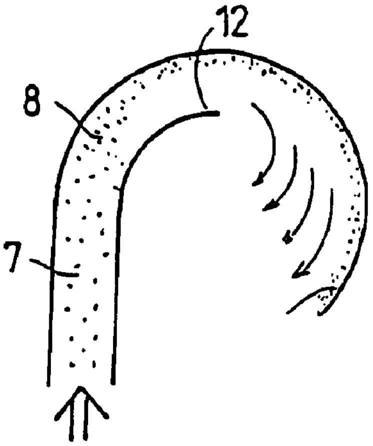

In FIG. 1 there is a centrifugal separation device 8 according to the basic idea of the invention, ready to accommodate a cross-flow rotor 2 into the separating internal space.

In FIG. 2 there is a cross-flow fan according to the invention, complete with suction elements, and it can be seen here that the house 1 of the cross-flow fan is constructed as a pneumatic duct 13 at the same time, and the rotor 2 is situated in it, equipped with a drive mechanism 25 with a regulatable number of revolutions per minute. Above the intake opening of the fan, determined by an arc-angle of entry "α", there is a closed suction element 3, with a joining opening 26. The suction element mantle 4 joining the two terminal points of the arc-angle of entry "α" measured on the external side of the rotor and the suction element internal mantle 22 have a common tangent line 6 with the rotor blade 5 at the joining point.

When completed with further elements, the fan is constructed as a smooth suction separation device, where the centrifugal separation device 8—which is, for example, a fitting piece of about 90°, with the same width as the axial house size of he fan—is connected to the joining opening 26. The rotor 2 is connected to the internal edge of the centrifugal separation device 12 through the suction element internal mantle 22. The dense-current fraction outlet 9 is placed on the connection line of the centrifugal separation device 8 and the suction element external mantle 4, and at the joining opening 26 it is necessarily of the same width as the centrifugal separation device 8.

In the case of the construction of the smooth suction separation device as shown in FIG. 3 the closed suction element 3 is extended with a deposit chamber 24, and the cellular solid material outlet 10 is placed under it. The rotor 2 is connected to the internal edge of the centrifugal separation device 12 through the suction element internal mantle 22. The suction element internal mantle 22 and the internal mantle inside the deposit chamber 23 are joined to the two terminal points of the arc-angle of entry "α" and the suction element internal mantle 22 and the adjacent part of the internal mantle of the deposit chamber 23 have a common tangent line 6 with the rotor blade 5 at the joining point.

In the case of the construction shown in FIG. 4, a screw-system solid material outlet 11 can also be placed under the deposit chamber, with a discharge opening on the one end.

In FIG. 3 it can be seen that the suction duct 7 and the pressure duct 13 are arranged next to each other, and they have a single common dividing wall 14, and the intake opening 15 and the escape opening 16 are connected by a circulation element 17.

The bulk material feeder 18 is placed above the intake opening 15 on the suction duct 7, and the bulk material outlet is placed under it.

In FIG. 5 the shutter-type air-blast system of a possible construction of the suction separation device can be seen, where between the bulk material feeder 18 and the bulk material outlet elements 19, in the side of the intake duct 7 there are shutter elements 20 one after the other, and the angle of the shutter elements 20 to the horizontal level "β" is bigger than the natural slope angle of the bulk material, and the angle determined by the line of shutter elements "δ" is bigger than the angle of the shutter elements to the horizontal level "β", but a maximum of 90°, and the angle of the straight line connecting the lower and upper edges 21 of the successive shutter elements 20 "ϵ" to the horizontal level is smaller than the natural slope angle of the bulk material. The centrifugal separation device 8 is connected to the shutter-type intake duct 7. The further constituents of the equipment are the same as those of the equipment shown in FIG. 2 and FIG. 3.

The part-device shown in FIG. 5 is an adapter, and it can be connected to any suction separation device according to the invention.

In order to rotate the rotor 2, a drive mechanism 25 with a regulatable number of revolutions per minute is constructed on the cross-flow fan and the smooth suction separation device.

In order to rotate the cellular 10 or screw-system 11 solid fraction outlet a separate drive unit, not shown in the drawing, is built in.

The operation of the cross-flow fan according to the invention is explained on the basis of FIG. 2. The air taken in through the joining opening 26 of the closed suction element is guided by the suction element mantles 4, 22 towards the rotor blades 5 of the rotor 2. The speed of revolution of the rotor 2 and the delivered amount of air can be changed with the drive mechanism of a regulatable number of revolutions 25. Smooth flow is realised in the complete width of the fan and the joining opening 26. The fan according to the invention operates in suction and compression mode.

The operation of a possible suction separation device according to the invention is explained on the basis of FIG. 2. The suction is realised with smooth flow, through the intake duct 7. The mixture of air and solid fraction passes through the centrifugal separation device 8, it is separated, and the solid parts are condensed along the external mantle 4.

The dense-current fraction outlet 9 situated at the place of the initial separation lets out the solid fraction and a smaller proportion of the air, and practically a further low-capacity suction separation device can be connected to it.

A greater part of the transported air passes through the rotor 2 in a clean condition. Smooth flow is realised in the whole equipment.

The equipment shown in FIG. 3 is a grain cleaner with a pneumatic duct, which operates as described below. From the cereals to be cleaned that entered the intake duct 7 through the bulk material intake element 18, the counter-current air-flow entrains the light solid fraction.

The mixture of air and solid fraction passes through the centrifugal separation device 8, it is separated, and the solid fraction enters the deposit chamber 24 along the suction element mantle 4, then it leaves through the cellular outlet 10, while the cleaned air is guided towards the rotor blades 5 by the suction element mantle 4, the suction element internal mantle 22 and the suction element internal mantle on the side of the deposit chamber 23. Smooth air-flow is realised along the whole circulation path.

This equipment, with lengthened suction-pressure air-ducts, operates as an air-flow transportation separation device, for example, in the case of cereal mills it bridges over two technological levels, when with the rotor's speed of revolution the air amount is set so that the air entrains the complete amount of the input bulk material.

The shutter-type air-blast equipment shown in FIG. 5 operates as described below. The cereal to be cleaned flows onto the shutter elements 20 through the bulk material intake 18, it is separated, and flows towards the outlet 19. The air sucked in crosswise through the shutter elements and the cereals entrains the solid fraction, which is lighter than the grains. In the following the separation takes place as shown in the case of the equipment as in FIG. 2 and FIG. 3. The cereals cannot escape through the shutter elements.

In the case of the equipment shown in FIGS. 3, 4 and 5 the amount and the speed of the air can be regulated continuously with the help of the drive mechanism 25.

The cross-flow fans according to the invention are actually not more expensive than other type of fans, and the suction separation devices according to the invention are simple and compact, and they can be produced more cheaply than the types used so far.

The installation of the cross-flow fans and smooth suction separation devices is cost-saving, because they can be installed directly in the place of suction.

The use of the devices has several operational advantages due to the smooth flow of suction or suction and pressure mode.

LIST OF REFERENCES

1 house
2 rotor
3 closed suction element
4 suction element mantle
5 rotor blade
6 common tangent line
7 suction duct
8 centrifugal separation device
9 dense-current fraction outlet
10 cellular solid material outlet
11 screw-system solid material outlet
12 centrifugal separation device
13 pneumatic duct
14 common dividing wall
15 intake opening
16 escape opening
17 circulation element
18 bulk material feeder
19 bulk material outlet elements
20 shutter elements
21 straight line connecting the lower and upper edges of the shutter elements
22 suction element internal mantle
23 internal mantle inside the deposit chamber
24 deposit chamber
25 drive mechanism
26 joining opening
α arc-angle of entry
β angle of the shutter elements to the horizontal level
δ angle determined by the line of shutter elements
ϵ angle of the straight line connecting the lower and upper edges 21 of the successive shutter elements

What is claimed is:

1. A cross-flow fan, comprising:
a housing constructed as a pneumatic duct and having an intake opening;
a rotor disposed in said housing; and
a closed suction element disposed above the intake opening and adjacent to said rotor;
wherein said closed suction element has a suction element external mantle and a suction element internal mantle, said suction element external mantle joins two terminal points of an arc-angle of entry measured on an external side of said rotor, and said suction element external mantle and said suction element internal mantle have a common tangent line with said rotor blade at a joining point.

2. The cross-flow fan of claim 1, further comprising a drive mechanism operating at a number of revolutions per minute which is regulatable.

3. A cross-flow fan, comprising:
a housing constructed as a pneumatic duct and having an intake opening;
a rotor disposed in said housing; and
a closed suction element disposed above the intake opening and adjacent to said rotor;

said cross-flow fan further comprising a dense-current fraction outlet disposed at an end of said cross-flow fan remote from said intake opening.

4. A cross-flow fan, comprising:
a housing constructed as a pneumatic duct and having an intake opening;
a rotor disposed in said housing; and
a closed suction element disposed above the intake opening and adjacent to said rotor;
said cross-flow fan further comprising a dense-current fraction outlet disposed adjacent to said closed suction element.

5. A smooth flowing suction separation device, comprising:
a curved centrifugal separation device having an internal edge;
an intake opening at one end of said curved centrifugal separation device;
a housing disposed adjacent to said curved centrifugal separation device, and constructed as a pressure duct;
a rotor disposed in said housing; and
a closed suction element disposed adjacent to said rotor and attached to said internal edge of said curved centrifugal separation device;
said device further comprising a cellular solid material outlet disposed at an end of said curved centrifugal separation device, and a deposit chamber disposed between said closed suction element and said cellular solid material outlet.

6. The device of claim 5, wherein said closed suction element has a suction element external mantle and a suction element internal mantle, said suction element external mantle joins two terminal points of an arc-angle of entry measured on an external side of said rotor, and said suction element external mantle and said suction element internal mantle have a common tangent line with said rotor blade at a joining point.

7. The device of claim 5, further comprising a dense-current fraction outlet disposed at an end of said curved centrifugal separation device adjacent to said closed suction element.

8. The device of claim 5, wherein said intake opening and said pressure duct are disposed adjacent to each other with a common dividing wall therebetween.

9. The device of claim 5, further comprising an escape opening disposed at one end of said pressure duct, and a circulation element interconnecting said intake opening and said escape opening.

10. The device of claim 5, wherein said intake opening includes a bulk material feeder and a bulk material outlet.

11. The device of claim 10, further comprising shutter elements disposed between said bulk material feeder and said bulk material outlet.

12. The device of claim 5, further comprising a drive mechanism operating at a number of revolutions per minute which is regulatable.

13. A smooth flowing suction separation device comprising:
a curved centrifugal separation device having an internal edge;
an intake opening at one end of said curved centrifugal separation device;
a housing disposed adjacent to said curved centrifugal separation device, and constructed as a pressure duct;
a rotor disposed in said housing; and
a closed suction element disposed adjacent to said rotor and attached to said internal edge of said curved centrifugal separation device;

said device further comprising a screw-system solid material outlet disposed at an end of said curved centrifugal separation device.

14. The device of claim 13, further comprising a deposit chamber disposed between said closed suction element and said screw-system solid material outlet.

15. The device of claim 13, wherein said closed suction element has a suction element external mantle and a suction element internal mantle, said suction element external mantle joins two terminal points of an arc-angle of entry measured on an external side of said rotor, and said suction element external mantle and said suction element internal mantle have a common tangent line with said rotor blade at a joining point.

16. The device of claim 13, further comprising a dense-current fraction outlet disposed at an end of said curved centrifugal separation device adjacent to said closed suction element.

17. The device of claim 13, further comprising an escape opening disposed at one end of said pressure duct, and a circulation element interconnecting said intake opening and said escape opening.

18. A smooth flowing suction separation device comprising:

a curved centrifugal separation device having an internal edge;

an intake opening at one end of said curved centrifugal separation device;

a housing disposed adjacent to said curved centrifugal separation device, and constructed as a pressure duct;

a rotor disposed in said housing; and a closed suction element disposed adjacent to said rotor and attached to said internal edge of said curved centrifugal separation device;

wherein said intake opening includes a bulk material feeder and a bulk material outlet;

said device further comprising shutter elements disposed between said bulk material feeder and said bulk material outlet;

wherein said shutter elements are arranged one after another, and said shutter elements are inclined with respect to a horizontal level by an angle $\beta$ which is greater than a natural slope angle of bulk material.

19. The device of claim 18, wherein a line of said shutter elements forms an angle $\delta$ with the horizontal level which is greater than the angle $\beta$ but no greater than 90 degrees.

20. The device of claim 19, wherein a straight line connecting a lower edge of a given shutter with an upper edge of an adjacent shutter forms an angle $\epsilon$ with the horizontal level which is less than the natural slope angle of the bulk material.

21. The device of claim 18, wherein a straight line connecting a lower edge of a given shutter with an upper edge of an adjacent shutter forms an angle $\epsilon$ with the horizontal level which is less than the natural slope angle of the bulk material.

* * * * *